March 31, 1964     T. E. ROBERTSON     3,127,245
APPARATUS AND METHOD FOR PRODUCTION OF CARBON BLACK
Filed Feb. 15, 1962                              6 Sheets-Sheet 1
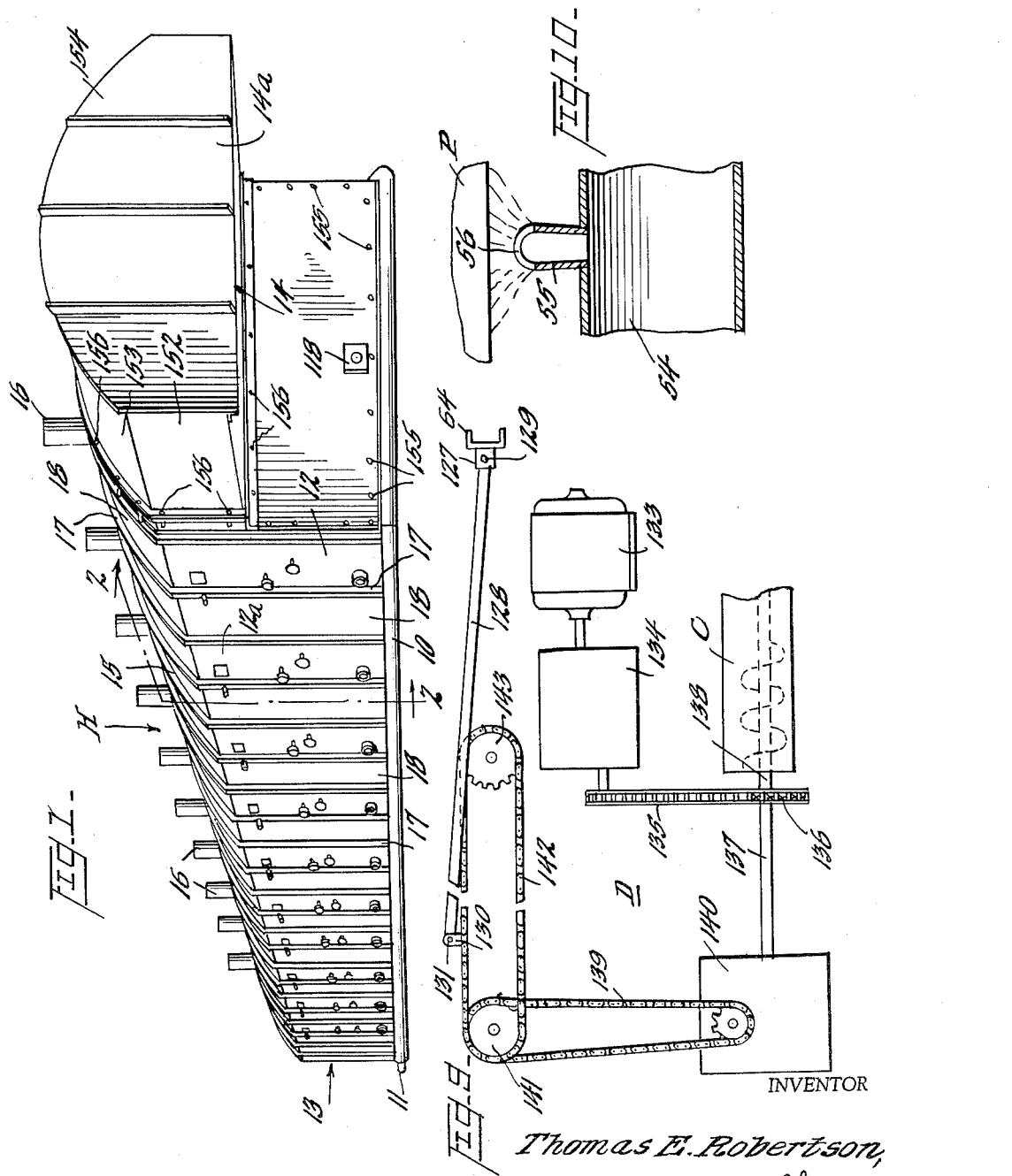
INVENTOR
Thomas E. Robertson,
BY Tacky & Asheroff,
ATTORNEYS

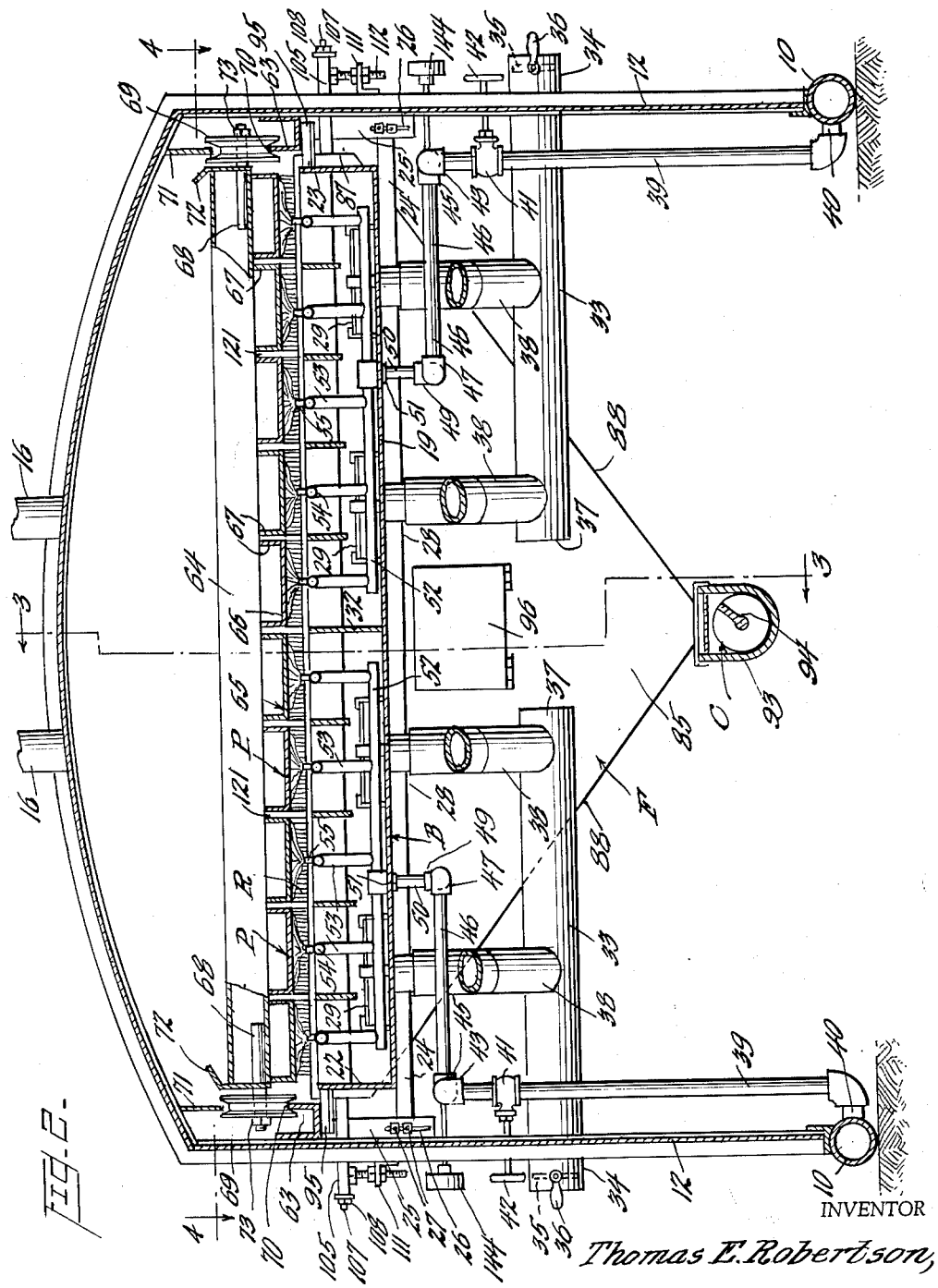

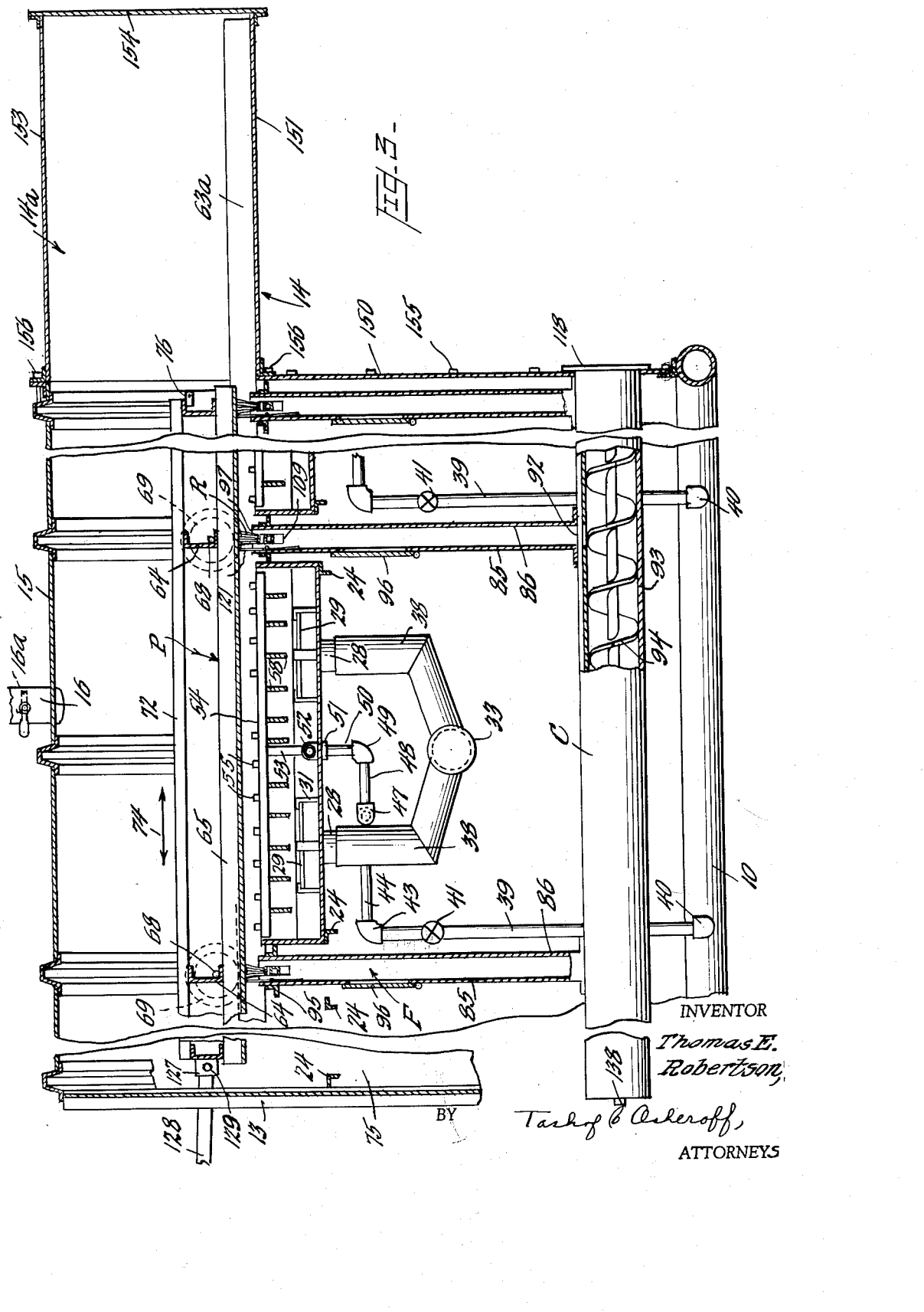

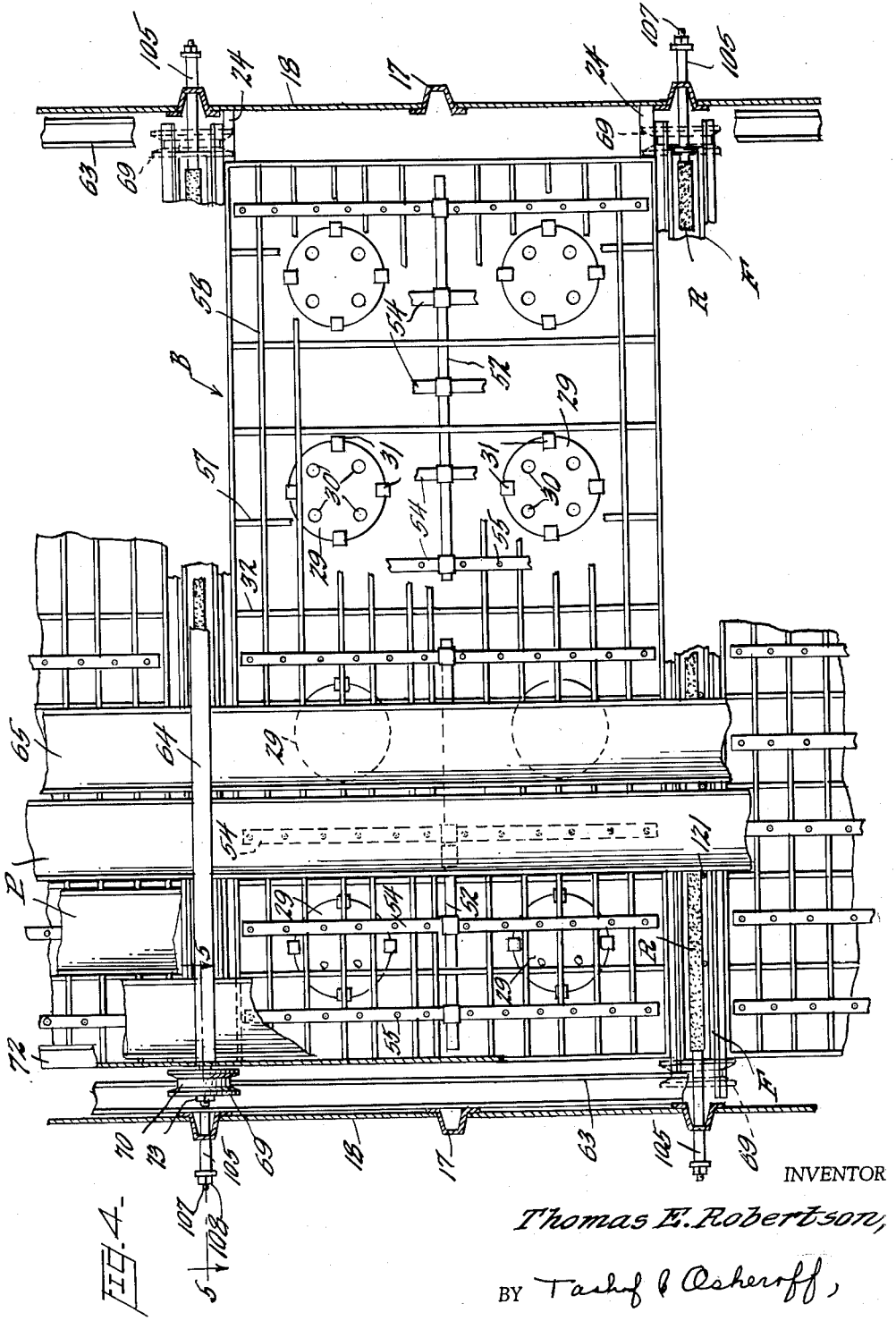

March 31, 1964   T. E. ROBERTSON   3,127,245
APPARATUS AND METHOD FOR PRODUCTION OF CARBON BLACK
Filed Feb. 15, 1962   6 Sheets-Sheet 5
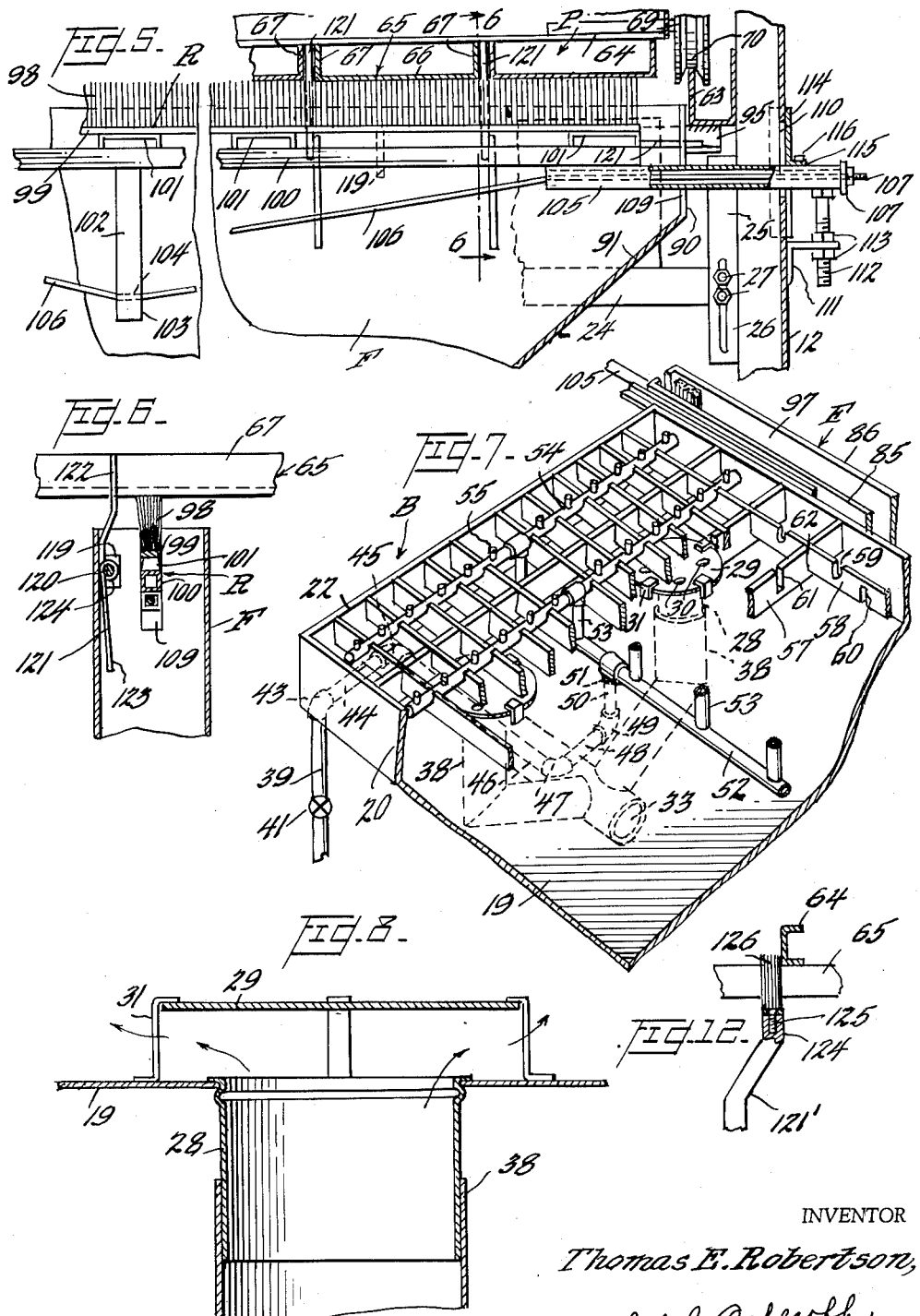
INVENTOR
Thomas E. Robertson,
BY
ATTORNEYS

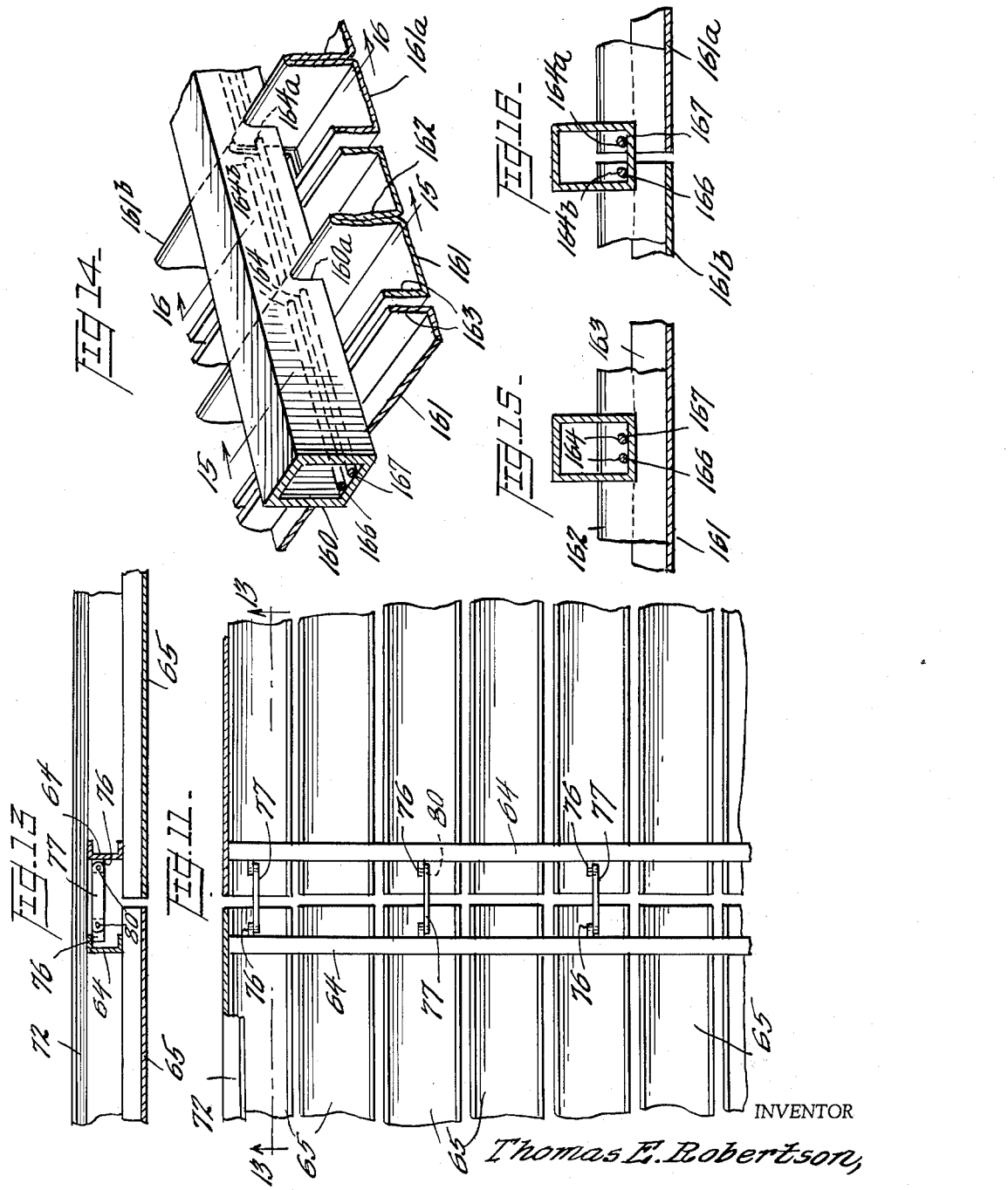

3,127,245
APPARATUS AND METHOD FOR PRODUCTION OF CARBON BLACK
Thomas E. Robertson, 1933 Main St., Dallas, Tex.
Filed Feb. 15, 1962, Ser. No. 173,463
33 Claims. (Cl. 23—209.8)

The present invention relates to the production of carbon black, and more particularly, to method and apparatus for the production of carbon black from gaseous fuels, such as natural gas.

The production of carbon black from natural gas is well known. In general carbon black is produced by burning natural gas in a plurality of small flames with the upper sections of the flames impinging on a metal collecting surface to deposit carbon black thereon. The metal surface is slowly drawn back and forth through the flames so that carbon black is deposited on the collecting surface. Scrapers remove the deposit from the collecting surface, drop it into screw conveyors to remove the carbon black from the burner house. The product from the burner house is then collected, blended, packed, or otherwise further processed. The assembly of the burners and the collecting surface or surfaces is enclosed in a metal burner house so constructed as to admit to the burners a controlled amount of air, so that the gas is incompletely combusted to form carbon black.

The carbon black produced is usually called channel black, and is used as pigments for printing inks, paints, carbon paper, etc., as well as fillers and/or reinforcing materials for rubber. It is desirable that the carbon black have very small particle size or fineness, as well as uniformity of particle size. In the prior art method and apparatus, it is frequently difficult to produce the desired quality of carbon black and at the same time produce a high yield. According to the present invention, not only does the carbon black produced have desirable qualities, but the yield produced is substantially greater than that produced by the prior art.

According to one aspect of the present invention, there is provided a method for the production of carbon black comprising burning gas in small flames at a plurality of spaced apart locations in atmospheric air to produce carbon black while substantially inhibiting horizontal movement of the air and recovering the carbon black so formed. According to the preferred form of the invention, the combustion air is supplied to the gas burners in the form of upwardly moving columns of air substantially free of horizontally moving air. The air is supplied at atmospheric pressure with the upward movement of the air being caused only by convection.

According to another aspect of the present invention, there is provided an apparatus for the production of carbon black comprising a plurality of horizontally spaced apart burner nozzles, means for supplying gas to said nozzles, means for supplying upwardly moving combustion air around said nozzles in the absence of substantial horizontal movement of the air, and collecting means for collecting the carbon black formed by the burning of the gas. More particularly, according to the apparatus of the present invention, baffle means are provided around each burner or small groups of burners, so as to direct the flow of air upwardly around the burners while minimizing horizontal movement of the air.

An important factor in the production of carbon black is the air supply. The quality and yield of carbon black is controlled by controlling the air supply. The air supply according to the present invention is controlled in two ways. First, as stated above, the movement of the air around the burner nozzles is controlled so that the air flows freely with a minimum of directional variations. In this manner, there is obtained a uniform flow of air at the burner nozzles and the flames burn steadily with a minimum of flickering or variations in direction or height. Preferably, the air flows upwardly around the burner nozzles by convection only. Secondly, the total amount of air available at the burner nozzles is controlled by having separate air intakes for each burner box.

Therefore, according to another aspect of the invention, there are provided a plurality of spaced apart burner boxes, each having mounted therein a plurality of spaced apart burner nozzles, each burner box having its own individual means for supplying air from the atmosphere to the burners.

According to a still further aspect of the present invention, there is provided a particular means for removing the carbon black from the plates on which the carbon black has been deposited, said means comprising brushes which brush against the surface of the collector plate.

In order to control the quality of the carbon black, it is also desirable to control the length of time the carbon black remains on the collector plates, and it is also important to remove the carbon black from the plates uniformly and completely. This control is effected in the present invention by the utilization of brush scrapers to remove the carbon black in a uniform manner.

It will be appreciated that for efficient operation, it is highly desirable to have the carbon black manufacturing apparatus located as close to the supply of natural gas as possible. In this manner, there can be eliminated the expense of transporting the gas to the apparatus. Frequently there occur wells which only yield natural gas for relatively short periods of time, and it would be uneconomical to construct pipe lines from such wells to a central factory for the production of carbon black. The present invention has solved this problem by providing an apparatus which, while highly efficient, is of such size and so constructed that it is portable, so that it can be located adjacent the gas producing well and moved from well to well as the occasion demands.

It is an object of the present invention to provide a method and apparatus for producing an excellent quality carbon black in an economical manner.

It is a further object of the invention to provide a method and apparatus for supplying air to a carbon black burner in a controlled manner.

It is a further object of the invention to provide a portable apparatus for the production of carbon black.

It is a further object of the invention to provide a means for efficiently and uniformly removing the carbon black deposited on the collector plates.

The above enumerated objects and aspects of the present invention, together with other objects and aspects will be readily apparent from the following description, in connection with the accompanying drawings, wherein FIGURE 1 shows a perspective view, taken from the rear end, of the apparatus enclosed in its housing;

FIG. 2 is a vertical transverse section of the apparatus, taken along the line 2—2 of FIG. 1;

FIG. 3 is a vertical longitudinal section of the apparatus, taken along the line 3—3 of FIG. 2, with parts being broken away;

FIG. 4 is a fragmentary top elevation, taken along the line 4—4 of FIG. 2, with parts being broken away, and parts being shown in section;

FIG. 5 is a fragmentary vertical cross section, taken along the line 5—5 of FIG. 4, and showing in detail the brush means for removing the carbon black from the collector plate;

FIG. 6 is a vertical section along the line 6—6 of FIG. 5 showing in greater detail a probe for removing the carbon black deposit between the strips comprising a collector plate;

FIG. 7 is a fragmentary perspective view, with parts being broken away, of a portion of a burner box, and a hopper adjacent thereto;

FIG. 8 is a fragmentary vertical cross section, showing a detail view of the air supply duct and baffle disc for introducing air into the burner;

FIG. 9 is a diagrammatic view, showing a drive for driving the moving parts of the apparatus;

FIG. 10 is a fragmentary vertical section showing the detail of a burner nozzle;

FIG. 11 is a fragmentary top elevation of a collector plate made in two sections, showing the means for linking the two sections;

FIG. 12 is a fragmentary vertical elevation of a modified probe;

FIG. 13 is a vertical section taken along the line 13—13 of FIG. 11;

FIG. 14 is a fragmentary perspective view of a modified collector plate construction;

FIG. 15 is a vertical section, taken along the line 15—15 of FIG. 14;

FIG. 16 is a vertical section, taken along the line 16—16 of FIG. 14.

*Brief Description of Apparatus*

Briefly, the apparatus of the present invention comprises four main parts, said parts being, (1) a housing H, which defines the enclosure and/or support for the remaining structure of the apparatus; (2) the combustion means for burning fuel to produce carbon black; (3) the means for collecting the carbon black formed by the combustion means; and (4) the drive means for driving the moving parts of the apparatus.

The combustion means included a plurality of longitudinally spaced apart burner boxes B, in which are mounted the burners for burning the gas; means for supplying gas to the burners; means for supplying the combustion air to the burners; and means for controlling the flow of air.

The means for collecting carbon black includes a collector plate P, which is mounted for reciprocal movement over the burner in the burner box, so that the carbon black formed by the flames is collected or precipitated thereon. The collecting means further includes carbon black collecting bins or hoppers F which are positioned between the burner boxes; means for removing the carbon black from the collector plate P comprising brushes R positioned over the hoppers F; and screw conveyor means C which collects the carbon black from the bottom of the hoppers F and delivers the carbon black to a receptacle or other device for further shipment or handling of the carbon black.

The hoppers F are also longitudinally spaced apart and alternate with the burner boxes B in the housing H.

The drive means D includes means for reciprocating the collector plate P and for driving the screw conveyor means C.

In the following description, the parts of the apparatus will be discussed separately under separate headings.

*Housing*

The base of the housing (see FIG. 1) in the illustrated embodiment is rectangular in form, and is constituted by the gas manifold main 10 which is a pipe or conduit in the form of a closed loop around the perimeter of the housing. Conduit 10 has, near the front end of the housing, a nipple 11 to which additional piping (not shown) may be attached for feeding fuel from a supply (not shown) into the apparatus. Mounted on the gas main 10 are side walls 12, front wall 13 (see FIG. 3) and rear closure 14 (see FIGS. 1 and 3) of the housing. Positioned on top of the walls is roof 15 which in the illustrated embodiment is arcuate in shape. On the roof near the upper extremity thereof are mounted a plurality of longitudinally spaced stacks 16, whereby the gaseous products of combustion and the generated heat may escape from the inside of the housing.

The housing H is constructed of spaced apart ribs 17 interconnected by closure plates 18. As stated previously, the other elements of the apparatus are mounted on the plates and ribs of the housing, and, in the illustrated form of the invention, all of the elements of the apparatus are enclosed within the housing except for drive means D which are mounted on the exterior of the front wall 13. The rear closure 14 of the housing may be removable for purposes to be described hereinafter. In the illustrated embodiment, the housing is positioned directly on the ground with the gas manifold main 10 actually resting on the ground.

In each of the side walls 12, there are provided sliding access doors 12a positioned at about the level of the burners, so that the flames can be viewed, when desirable, from the outside of the housing. The stacks, or ventilators 16, are provided with dampers 16a which can be used to assist in the control of the flow of air and combustion gases from the housing.

*Combustion Means*

The combustion means (see FIGS. 2, 3, 4, 7, 8 and 10) comprises a plurality of longitudinally spaced apart horizontal burner boxes B. Each burner box is generally rectangular in form and has a bottom 19, upwardly extending side walls 20 and 21 and upwardly extending end walls 22 and 23. The burner boxes rest on transverse burner box supporting beams 24, two for each box, which extend substantially from one side wall 12 to the other side wall 12 of the housing H. On the interior of each side wall of the housing, there is secured a vertically extending inwardly directed mounting bracket 25 having a vertical slot 26 therein. Each end of the burner box supporting beam 24 is secured to bracket 26 by means of bolt 27, the bolt 27 being capable of sliding in slot 26, so that the beams 24 may be adjusted vertically. It is desirable that the slot 26 be about 3 inches long so as to provide for about 3 inchs of vertical adjustment of beams 24, and therefore, of burner boxes B.

The long dimension, that is, the dimension represented by side walls 20 and 21, of the burner box B, runs transversely of the housing H, with the short dimension, as represented by end walls 22 and 23, running longitudinally of the housing H.

A plurality of downwardly extending air supply ducts 28 are mounted in the bottom 19 of the burner box, said ducts being, in the illustrated embodiment, eight in number for each burner box. In the interior of each burner box there is positioned above each air supply duct 28, a horizontal baffle disc or plate 29 having several perforations 30 therethrough, the baffle plates 29 being secured to the bottom 19 of the burner box by brackets 31, so that the baffle discs 29 are spaced above the bottom of the burner box (see FIGS. 2, 3, 4, 7 and 8). The burner box is divided into two lateral sections or halves by means of a centrally disposed longitudinally (relative to the housing H) extending vertical baffle plate 32 which extends from the bottom 19 of the burner box to the upper edge of the side walls 20, 21 of the burner box.

Air for combustion is separately supplied into each section of the burner box. In the illustrated embodiment, there are eight air supply ducts for each burner box, and, therefore, there will be four air supply ducts, properly distributed, for each section of each burner box. The four air supply ducts 28 in each section receive air from a single air supply manifold duct 33, there being a separate air supply manifold duct 33 for each section of each burner box.

The outer end 34 of each air supply manifold duct 33 extends through the respective side wall 12 of the housing H and is in communication with the atmosphere, communication being controlled by a damper 35 in the outer end 34 of manifold duct 33. The damper 35 is adjusted by means of lever 36. The inner end 37 of air supply manifold duct 33 is closed.

It is, therefore, apparent that two air supply manifold ducts 33 are positioned under each burner box B, one for each section, each duct supply air from the atmosphere on the side of the housing corresponding to the section of the burner box. Branch ducts 38 provide communication between each air manifold duct 33 and its corresponding air supply ducts 28. The lower end of each air supply duct 28 is received within the upper end of the branch duct 38 to form a sliding connection so that air supply duct 38 will remain connected to branch duct 38 when the burner boxes B are raised or lowered.

Each burner box (see FIGS. 2, 3 and 7) is provided with two separate gas supply arrangements, one arrangement for each section of the burner box, each gas supply arrangement including a vertical supply pipe 39, which is connected with the gas manifold main 10 at tap 40. Vertical pipe 39 has therein a globe valve 41 whose control handle 42 is positioned on the exterior of the adjacent side wall 12 of the housing H. Above valve 41 the piping continues through elbow 43, longitudinally extending pipe 44, elbow 45, laterally extending pipe 46, elbow 47, nipple 48, elbow 49 and vertical nipple 50, the latter being connected to fitting 51 secured to and passing through the bottom 19 of the burner box B.

In the interior of the burner box there is disposed a laterally extending horizontal gas burner manifold 52 which is connected generally centrally thereof to fitting 51 and a plurality of laterally spaced apart risers 53 are mounted on burner manifold 52. A longitudinally extending burner pipe 54 is connected to the upper end of each riser 53, the burner pipe extending substantially from one side wall 20 to the other side wall 21 of the burner box B. As is apparent from FIG. 4, each burner pipe 54 in each burner box is longitudinally aligned with the corresponding burner pipe of the other burner boxes. For example, burner pipes 54a, 54b, and 54c, each in a different burner box, are substantially aligned.

The upper surface of each burner pipe 54 lies substantially in the plane defined by the upper extremities of the side and end walls of the burner box. Longitudinally spaced apart standard hollow ceramic burner tips or nozzles 55 are mounted on the upper side of each burner pipe 54, each tip having a vertical slit 56 (see FIG. 10) therein through which the gas flows. The burner tips extend above the plane defined by the upper extremities of the walls of the burner box B.

From the above description, it is apparent that the fuel gas is supplied from the gas manifold main 10, through the piping described, to the burner nozzles at which location the gas burns in an atmosphere of air being supplied from the exterior of the housing H through air supply manifolds 33, branch ducts 38, air supply ducts 28 into the bottom of burner boxes B.

Since the fitting 51 is secured to the bottom 19 of the burner box B, the fitting 51 will move with the burner box when the latter is raised or lowered. By providing the various elbows in the gas piping, accommodation is easily made for the vertical movement of the burner box.

One of the important aspects of the present invention is the means for controlling the flow of air to the burner nozzles 55 in such a manner as to minimize or inhibit substantial horizontal movement of the air in the vicinity of the burner nozzles. This is accomplished, in the illustrated embodiment, by providing in the burner box a baffle arrangement comprising longitudinally extending vertical baffles 57 and laterally extending vertical baffles 58 (see particularly FIGS. 4 and 7), said baffles, in each section of the burner box, being spaced above the bottom 19 of the burner box so that the air coming out of the air duct 28 can freely flow beneath the baffles.

It will be appreciated that as the air enters the burner box through air duct 28, baffle or diffuser plate 29 serves to direct the air underneath the baffles 57 and 58.

The upper edges of baffles 57 and 58, like central baffle 32, lie in the plane defined by the upper edges of the walls of the burner box B. Baffles 58 have spaced apart cutouts 59 along the upper edge to accommodate burner pipes 54. Baffles 57 and 58 are assembled, or secured to each other, by providing slits 60 on the lower side of baffle 58 and slits 61 on the upper side of baffle 57 so that baffle 58 can be slid into slits of baffle 57 as is common in providing a criss-cross arrangement of vertical plates. Baffles 57 and 58 are tack-welded together as shown at 62 to make a more rigid assembly.

Attention is directed to the fact that the baffle plates 57 run generally centrally between burner pipes 54 and baffle plates 58 run generally centrally between the burner nozzles 55, except for the baffle plate 58 immediately adjacent the risers 53, which, because of the presence of the risers are somewhat off center. It is, therefore, apparent that the space beneath each burner nozzle 55 is defined by intersecting baffle plates 57 and 58 (central baffle 32 serving the purpose of baffle 57 at the longitudinal center of the burner box). The baffle plates, therefore, provide a plurality of rectangular conduits or passageways for supplying air from the bottom of the burner box to the nozzles, there generally being a separate passageway for each burner nozzle, it being understood that occasionally, because of construction problems, there may be a passageway for more than one burner nozzle, as would be the situation if the baffle plate 58 adjacent the risers were eliminated because of interference caused by the presence of the risers 53.

*Means for Collecting Carbon Black*

As shown in FIGS. 2, 4 and 5, near the upper end of each side wall 12 of the housing H, there is secured a longitudinally extending rail 63, which runs substantially the full length of the housing, the rails 63 supporting carbon collector plate P. Carbon collector plate P (see also FIGS. 3 and 11) comprise transverse U-shaped or channel beams 64, to the under side of which is secured individual longitudinally extending laterally spaced apart collector strips 65. Collector strips 65 are channel or U-shaped and comprise a flat bottom portion 66 and upwardly extending arms or flanges 67, the upper edges of arms 67 being welded to the under side of beam 64.

At each lateral end of each beam 64 is fastened an axle 68, on which is rotatably mounted a grooved wheel 69, the groove 70 of the wheel 69 riding on rail 63, so that the entire collector plate P may be reciprocated or rolled back and forth longitudinally of the housing. An upper downwardly directed guide rail 71 is secured to the housing H above lower rail 63, with the lower edge of rail 71 also extending into groove 70 of wheel 69 so as to prevent the wheels 69 from jumping off the rail 63. At each lateral end of the collector plate is mounted a longitudinally extending vertical bracing and guide strip 72. The wheel 69 is secured on axle 68 by means of a nut 73 so that the wheel 70 can move laterally along the axle 68 between side plates 72 and nut 73. In this manner, expansion and contraction of the collector plate will not force the wheels 69 off the track 63.

The collector strips 65 are laterally spaced apart with the arm or flange 67 of one strip being about one-half inch away from the adjacent arm or flange 67 of the next strip.

The collector strips 65 correspond in number to the number of burner pipes 54 in the burner box B with the longitudinal center of each collector strip being approximately over the axes of the aligned burner pipes 54 of the burner boxes B. In this manner, the flame of each burner nozzle will generally strike the longitudinal center of a collector strip 65.

The collector plate P is longitudinally reciprocated in the direction of the double arrow 74 (see FIG. 3), and during this reciprocation, the flames of each row of aligned burner pipes continually impinge the longitudinal center of a corresponding collector strip 65. As previously stated, the burner boxes B and the hoppers F alternate throughout the length of the housing except that normally at the extreme front and extreme rear of the housing, there is no burner box or hopper. The collector plate P, whether made in one section or in a plurality of sections as hereinafter described, is somewhat longer than the combined longitudinal length of the assembly of burner boxes and hoppers, the collector plate P merely being sufficiently longer than the length of said assembly so that during reciprocation of the plate P, the end burner box and hopper are not uncovered. For example, in a preferred embodiment, the total length of the assembly of burner boxes and hoppers is about fifty feet, and the collector plate is fifty-five feet long, with the collector plate moving five feet as it reciprocates.

To accommodate the extra five feet of the collector plate P as compared to the assembly of burner boxes and hoppers and to provide room for the five feet of reciprocation, the housing is sixty feet long. In the first five feet of space of the housing H rearwardly of front wall 13, as shown at 75 in FIG. 3, there is no burner box B, although there are provided in this space burner box supporting beams 24 for a purpose hereinafter described. At the rear end of the housing, the five feet of space for reciprocating the collector plate is provided by rear closure 14, which projects inwardly from the last hopper about five feet.

The rails 63 are positioned at such a height that the flames from the burner nozzles 55 impinge on the bottom of the collector plate P, the bottom being defined by the lower surface of collector strips 65, so that the carbon black formed by the incomplete combustion of the gas will be collected or deposited on the bottom of the collector plate P.

The collector plate P may comprise a longitudinal section fifty-five feet long with each of the strips 65 being fifty-five feet long. However, it is frequently desirable to make the collector plate in plural longitudinal sections linked to each other in order to minimize warping of the plate during heating and to provide for expansion of the metal. When the plate is in sections, as shown in FIG. 11, the beams 64 at each end of a section may be provided with spaced apart lugs 76, there being a lug adjacent every other collector strip, the lugs of one section facing the next section. Connector links 77 are provided to connect the lugs 76 of one section with corresponding lugs 76 of the next adjacent section, bolts 80 passing through cooperating bores in the lugs and the ends of the links to fasten the connector links to the lugs. This type of connection permits slight movement, both vertical and longitudinal, of one section of the collector plate relative to the next section of the collector plate. Warping of the collector strips also is minimized by having the upper extremity of arm 67 of the collector strips about the lower surface of beams 64.

Between adjacent burner boxes are mounted the carbon collecting bins or hoppers F which are generally in the shape of flattened funnels, the greater dimension extending laterally of the housing. The hoppers F (see FIGS. 2, 3, 4 and 7) are constituted by longitudinally spaced apart laterally extending vertical side walls 85 and 86. The upper extremities 87 of the lateral edges of the side walls 85 and 86 are vertical and below this upper extremity, as shown at 88, the side walls taper downwardly and inwardly. The lateral ends of the hoppers are closed by end walls secured to the lateral edges of the side walls, the upper end 90 of the end wall being vertical with the remainder 91 of the end walls being downwardly and inwardly inclined to correspond with the shape of the side walls 85 and 86.

The bottom of the hopper defines a discharge opening 92 so that the contents of the hopper can be continuously discharged into longitudinally extending screw conveyor C mounted below the bottom of the hoppers. Screw conveyor C comprises a U-shaped trough 93 in which is mounted helical screw 94.

Along the upper edge of each side wall 85, 86 of the hopper there is fastened on the outside thereof angle iron beam 95 thus providing two beams for each hopper. The beams 95 constitute the means for fastening or mounting the hoppers on the housing H, the ends of beams 95 being secured to the side walls of the housing. In the illustrated embodiment, the width of each hopper is approximately five inches, the width being the spacing between the side walls 85, 86 of each hopper. The hoppers and the burner boxes alternate substantially throughout the length of the housing, and if possible no space, or a minimum space, is provided between the hoppers and the adjacent burner boxes.

Each hopper F is provided in side wall 85 with an access door 96 to provide access to the interior of the hopper when necessary, for cleaning, etc.

Means are provided for removing accumulated carbon black from the collector plate and transferring the removed carbon black into hoppers F. This means is preferably constituted by brushes R (see FIGS. 2, 3, 4, 5 and 6), which run laterally, relative to the housing, and are positioned near the top edge of each hopper and generally centrally between the side walls 85 and 86 of each hopper. Each hopper is opened not only at the bottom, as shown at 92, but also opened at the top as shown at 97, the top opening running from one lateral end to the other lateral end of the hopper.

Each brush R comprises a plurality of vertically extending steel bristles 98 secured to a backing rod 99 and the backing rod is in turn secured to brush supporting rod 100 which is parallel to backing rod 99. Backing rod 99 may be secured to brush supporting rod 100 either permanently or temporarily such as by means of clips 101 in order to simplify replacement of the brush as the brush wears out. Near the mid point of brush supporting rod 100, there is secured a downwardly depending brace bar or rod 102 which has, near its lower end 103, a horizontal bore 104 therethrough. A short hollow or tubular extension 105 is secured to each end of bar 100, said extension 105 being parallel to bar 100. A tensioning member or rod 106 passes through bore 104 of bar 102 and the ends of the tensioning member 106 pass through tubular extensions 105, so that the extremities of tensioning member 106 extend beyond the lateral extremity of each extension 105, as shown at 107. Ends 107 are threaded and a nut 108 is screwed onto threaded end 107. It is apparent that by tightening nuts 108, the tension of tensioning member 106 is varied and the tension of member 106 in turn, through the medium of brace bar 102 serves to adjust the level of the center of brush R as compared to the extremities of brush R.

The brush assembly R is mounted in the hopper by providing the upper end 90 of each end wall with a slot 109 (see FIG. 5) so that extension 105 can be positioned therein. In addition, the side walls of the housing H are provided with a slot 110 in a line with slot 109 and extension 105 extends through slot 110 so that the extremity thereof is positioned outside the housing. On the outside of the housing, immediately below slot 110, is fastened a bracket 111, said bracket being provided with an adjustment screw 112 which is secured to the under side of extension 105. The height of the adjustment screw 112 is controlled by nuts 113. This provides means for adjusting the height of the brush assembly. A cover 114 is provided for covering the slot 110 and the cover has an outwardly extending lug 115 through which passes a screw 116 so that the cover can be fastened to extension 105 and moved therewith.

The height of the brush assembly is so adjusted that the upper ends of the bristles bear against the under surface of collector plate P. As the collector plate P reciprocates, any carbon black formed will be removed by the brushes and the carbon black will be free to fall into hoppers F and through hoppers F into trough 95 and is conveyed by helical screw 94 out through discharge 118 at the rear end of the housing, where the carbon black is collected.

On the interior of the side wall of each hopper there are mounted a plurality of laterally spaced apart lugs 119, said lugs being horizontally aligned and positioned near the top of the hopper. A pin 120 runs the length of the hopper and passes through the lugs 119. Mounted on the pin 120 are a plurality of laterally spaced apart vertical probes 121 (see FIG. 6), each probe comprising a relatively thin rod which is twisted so as to form an upwardly extending portion 122, a downwardly extending portion 123 and a twisted intermediate portion 124 which defines an opening through which the receiving pin 120 passes for holding the probes in position. It is apparent that the probes 121 can have some freedom of movement along the pin 120, that is, the probes are free to slide somewhat along pin 120. To prevent pin 120 from sliding out of the hoppers, the ends thereof may be tack welded to the hoppers.

The probes 121 are so spaced apart that one probe lies approximately on the longitudinal line defining the mid point between two adjacent burner pipes 54. In other words, the probes 121 are spaced so that the upper end thereof will be in alignment with the spaces between the strips 65 of the collector plate P and the height of each probe is such that it will extend just up to but not beyond the upper extremity of arms 67 of the strips 65 of the collector plate P. In this manner, as the collector plate reciprocates, the probes 121 will clean out any accumulation of carbon black between adjacent arms of the strips of the collector plate P. It is apparent that according to this construction, the probe cannot extend above the upper extremity of arm 67 because then the probe would strike the lower edge of cross beams 64 of the collector plate. However, if the longitudinal movement of the collector plate is so adjusted that it moves in each direction a distance not exceeding the distance between two adjacent probes, the probes can extend, and preferably will extend, above the upper extremity of arms 67.

In FIG. 12 there is shown a modification of the probe which renders it possible for the upper extremity of the probe to extend above the upper extremity of arms 67 of the strips 65 to effect more efficient cleaning out of the space between adjacent arms of the strips of the collector plate P. The modified probe 121' has, at its upper extremity 124, a vertical threaded bore and into this bore is threaded base 125 on which is mounted a resilient means such as metal bristles 126 with the metal bristles extending above the upper extremity of arms 67.

In this manner when the upper extremities of bristles 126 contact the lower edge of beam 64, they will yield to permit movement of the collector plate P.

Drive Means

The apparatus, as above described, comprises two moving elements, namely, the collector plate P and the screw conveyor C. It is apparent that these elements can be driven separately. However, a simple drive means D can be used to reciprocate collector plate P and to rotate screw conveyor C utilizing a single power source.

The forwardmost beam 64 of the collector plate P is provided with spaced apart lugs 127 between which one end of the drive rod 128 is pivotally mounted by means of pintle 129 (see FIGS. 3 and 9). The drive rod 128 extends through a slot in the front wall 13 of the housing and the outer end of the drive rod 128 is pivotally mounted on lug 130 by pintle 131.

All of the remaining elements of the drive means D are mounted on the exterior of the front wall 13 of the housing H. A motor 133 through speed reducer 134 drives chain 135, said chain 135 in turn driving sprocket 136 mounted on double ended shaft 137. One end of shaft 137 is coupled to the forward end 138 of screw conveyor C and the other end of shaft 137 drives chain 139 through speed reducer 140. Chain 139 in turn drives double sprocket 141, sprocket 141 in turn driving chain 142. Chain 142 is mounted around sprocket 141 and idler 143. Lug 130, to which is pivotally mounted the end of drive arm 128, is fastened to one of the links of chain 142. The reach of chain 142 is so adjusted that rotation of chain 142 will cause reciprocation of drive rod 128 through the desired distance which, in the exemplary embodiment, is 5 feet. Reciprocation of drive rod 128 in turn reciprocates collector plate P.

Operation

From the above description, it is apparent that the collector plate P is reciprocally mounted over the assembly comprising alternating burner boxes B and hoppers F. By way of example, there may be provided ten burner boxes and eleven hoppers, the assembly of burner boxes and hoppers beginning and ending with a hopper, as shown in FIG. 3. Further, by way of example, the hoppers are mounted on about five foot centers, each hopper being about five inches across its narrow dimension, that is, the dimension taken longitudinally of the housing. The burner boxes have a lateral dimension of about nine feet and have a longitudinal dimension of about four and one-half feet, the burner boxes being about eleven inches in height. This will produce an assembly of burner boxes and hoppers about fifty feet in length. As previously stated, the housing extends about five feet in front of the first hopper and extends about five feet for the last hopper, the last five feet being provided by rear closure 14 of the housing. The collector plate is about nine feet wide and fifty-five feet long, being made in three sections, as shown in FIG. 11, the two end sections being twenty feet long and the middle section being fifteen feet long. The collector strips 65 of the collector plate are mounted on six and one-half inch centers with the lateral space between adjacent collector plates being about one-half inch so that the bottom of each collector strip has a lateral dimension of about six inches.

The gas manifold main 10 has an internal diameter of four inches, the piping from the gas manifold main to and including the gas burner manifold 52 has an internal diameter of one and one-half inches, and the risers 53 and burner pipe 54 have an internal diameter of one inch. The burner pipes 54 are laterally spaced apart on six and one-half inch centers, so as to provide longitudinally extending rows of burner pipes on six and one-half inch centers. The burner nozzles on the burner pipes are spaced apart on four inch centers, there being twelve burner nozzles on each burner pipe. The upper edge of the burner nozzles extend about one-half inch above the upper surface of the burner pipes. In the illustrated embodiment, there are shown five burner pipes for each section of the burner box B. This number has been used for clarity in the drawings, although by way of actual example, there are preferably eight burner pipes 54 in each section of the burner box. The bottoms of the baffle plates 57 and 58 are spaced about five inches above the bottom 19 of the burner box.

The brushes are between two and three inches high and the burner boxes are so adjusted that the space between the bottom of the collector plate P and the upper tips of the burner nozzles 55 is about one to two inches.

With an apparatus of the above dimensions, the gas supply for each burner box is so adjusted that the flames of the burner nozzles impinge upon the under side of the collector plate with each flame forming a circle of flame on the collector plate about four inches in diameter. This causes a deposition of carbon black in a circle about six inches in diameter. The drive means D is started to cause reciprocation of the collector plate and rotation of the screw conveyor C. Collector plate reciprocates through a stroke of about five feet and moves about twenty-two minutes in each direction for a total cycle of forty-four minutes. As the collector plate reciprocates, the carbon black formed thereon is removed from the collector plate, is dropped into the hoppers and conveyed by the screw conveyor to discharge 118 at the rear end of the housing into a receptacle or other means for removing the carbon black from the housing.

The supply of air is controlled by operating the dampers 35. It will be appreciated that the air supply must be limited so that there is not a complete combustion of the gaseous fuel.

When operated as above set forth, it has been found that there can be produced in excess of 3.8 pounds of carbon black per thousand cubic feet of natural gas. The carbon black is deposited on the relatively cool collector plate. It is highly desirable to prevent irregular heating of the collector plate. Since carbon black will collect between the arm 67 of the collector strips 65, such a build up of carbon black will restrict the flow of combustion gases and heat upwardly from the flame through the collector plate.

By preventing irregular or localized heating of the collector plate, warping of the plate is minimized, and in addition, a much more uniform carbon black product is obtained. Probes, such as probes 121 and 121' keep the space between the collector strips free of carbon black, thereby permitting continual and uniform escape of combustion gases and heat through the collector plate. In this manner, local overheating of the collector plate is avoided and the entire plate remains relatively cool. The combustion gases or vapors include carbon monoxide, carbon dioxide, water, etc., and these gases together with the excess heat escape through the stacks or ventilators 16 at the top of the housing.

Instead of using natural gas, other combustible carbonaceous gases or vapors can be used, including a mixture of gas to which has been added some oil. The term "gas" as used herein includes all such carbonaceous vapors.

If desired, a pressure gauge 144 (see FIG. 2) can be fixed to elbow 43, so as to ascertain the pressure in each individual gas line.

As stated previously, the collector plate reciprocates through a stroke of about five feet, moving about 22 minutes in each direction for a total cycle of forty-four minutes. It will be appreciated that the collector plate continuously reciprocates as long as the apparatus is in use, the collector plate moving about five feet in one direction in twenty-two minutes and then moving five feet in the opposite direction in about twenty-two minutes, etc.

In the illustrated embodiment, the bottoms of the baffles 57 and 58 are spaced above the bottom of the burner box, so as to provide an air chamber below the baffles. The air is introduced into the air chamber by air ducts 28 and the deflector or diffuser plates 29 over the air ducts serves to diffuse or deflect the air from the air ducts throughout the air chamber. The intersecting baffles 57 and 58 in effect define vertical passageways, with one passageway being generally positioned beneath each burner nozzle. The baffles, and, therefore, the passageways, extend upwardly from below the burner nozzles to adjacent the burner nozzles, "adjacent" meaning a location just below to just above the burner nozzles, since under some conditions, it may be desirable to extend the upper extremities of the burner plates above the burner nozzles. These passageways defined by the baffles conduct air from the air chamber near the bottom of the burner box to the burner nozzles in columns of upwardly moving air while substantially inhibiting horizontal movement of the air supply to the burner nozzles. This results in the flames at the burner nozzles burning uniformly with minimum flickering.

In the illustrated embodiment, brushes are used to remove the carbon black from the collector plate. Instead of brushes, scrapers or doctor blades (not shown) can be used, but these are not as efficient nor as desirable as brushes since they tend to warp more readily under heat, are more difficult to adjust, and do not remove the carbon black as efficiently. By providing the brush supporting rod 100 with brace bar or brush levelling rod 102 and tensioning rod 106, the upper extremities of the bristles can be levelled, that is, adjusted to conform with the collector plate, so as to uniformly brush the carbon black from the collector plate.

One of the advantages of the present invention is that it can be made of such a size that it is easily transported to and from the supply of gas. Portability is enhanced by the dimensions of the housing. Reference has been previously made to the rear end 14 of the housing as being detachable. It will be appreciated from the dimensions given above that the length of the housing, excluding the rear end of closure 14, is fifty-five feet. This dimension has been selected because it represents the maximum length permitted by most states for a trailer. In this manner, the housing, excluding the detachable rear end portion 14 and the drive means on the front wall can be placed on a trailer and transported to the desired site. After the apparatus has been transported to the desired site, the rear end portion 14 can be secured to the housing.

Referring to FIGS. 1 and 3, the rear end portion 14 of the housing comprises a vertical lower plate or panel 150, and an upper chamber 14a constituted by bottom or shelf 151, side walls 152, arcuate top 153 and rear panel 154. The bottom 151, side walls 152, top 153 and panel 154 are secured to each other to define the chamber 14a which can be handled separately from lower panel 150.

Panel 150 is removably secured to the framework of the housing by bolts 155, and the chamber 14a is removably secured to the framework of the housing above panel 150 by means of bolts 156, so that the chamber 14a and lower panel 150 define a rear closure for the housing. The discharge 118 of the screw conveyor C passes through lower panel 150 and along the side walls 152 are mounted rail portions 63a which constitute extensions of rails 63.

When the apparatus is on the trailer, lower panel 150 is in position, but chamber 14a is not attached to the housing. Instead, another plate or panel (not shown) may be provided to close the opening at the rear of the housing above the panel 150. When the apparatus is placed on its operating site, the chamber 14a is secured to the housing by bolts 156. The purpose of the chamber 14a is to provide clearance for the rear end of the collector plate during its reciprocation.

It is frequently desirable to have at one operation location more than one carbon black apparatus. The apparatus herein described is particularly adaptable to be assembled in tandem. In other words, a plurality of housings with all the component parts therein can be aligned longitudinally with the single drive means D driving each unit. By way of example, let us assume two units (not shown) are to be assembled in tandem. The second unit is positioned behind the first unit, panel 150 and chamber 14a being removed from the first unit but being secured at the rear of the second unit. As previously described, at the front end of the apparatus, there is a five foot space to provide clearance for the collector plate during the reciprocation. In this space, there is normally no burner box, although burner box supporting bars 24 are provided.

When the units are connected in tandem, a burner box is positioned on the burner supporting bars 24 at the front end of the second unit. The collector plate of the first unit is connected to the connector plate of the second unit by means of connector strips 77, such as shown in FIGURES 11 and 13. The shaft of the screw conveyor of the second unit is connected to the shaft of the screw conveyor of the first unit by any suitable linkage (not shown) and the carbon black made by the two units is deposited through the discharge 118 at the rear of the second unit.

When the units are connected in tandem, gas is supplied to each unit individually through its own nipple 11 on the gas manifold main 10.

In FIGS. 14, 15 and 16, there is shown a modified form of the collector plate. In the modified construction, the channel beam 64 is replaced by a hollow square beam 160, to the ends of which are secured the wheels (not shown) in the same manner as are the wheels of the collector plate hereinbefore described.

The collector strips 161 are channel shaped or more accurately described T channel shaped, so as to provide an upwardly extending central web 162 which defines the arm of the T and lateral upwardly extending arms 163. Beam 160 is provided with spaced apart longitudinally extending slots 160a the slots extending into the hollow interior of the beam. The webs 162 are positioned in the slots 160a and the webs 162 are provided with openings 164 therethrough through which are passed pins or bars 166 and 167 for holding the webs 162 in the slots. The bars 166 and 167 lie in the hollow interior of beam 160. The upper extremities of arms 163 bear against the under side of beam 160 to minimize warping of collector strips 160.

The above described construction is particularly advantageous because it eliminates the need for welding the collector strips onto the supporting beams. This construction is also particularly adaptable for using strips which do not run the entire length of the plate, the joints in the strips occurring under beam 160.

Referring again to FIGS. 14 and 16, it will be noted that the end of a strip 161a and the end of another strip 162b are positioned under beam 160, each end having only one hole therethrough 164a and 164b, respectively. This construction facilities staggering the joints in the collector strips, if joints are necessary, as shown in FIG. 14, wherein strip 161 extends through beam 160 without a joint, while strips 161a and 161b are joined at the beam 160. If desirable, the joints in all the strips can be aligned (not shown) at a single beam 160. The construction shown in FIGS. 14, 15 and 16 not only renders the assembly of the collector plate more flexible, but also serves to reduce longitudinal warpage of the collector plate.

The pins and the openings may be so dimensioned that there is a slight play between the assembled elements, this play accommodating expansion of the metal. It will also be appreciated that the joints of the collector strips act as expansion joints.

It will be appreciated that the housing is divided into two chambers one above the other, the division or partition between the chambers being defined primarily by the burner boxes, the hoppers and also by the rails. The upper chamber is the combustion chamber, the space between the underside of the collector plate and the burners defining the combustion zone wherein the gas is burned.

It also will be appreciated that the space about each burner defines a flame zone. It is readily apparent that according to the apparatus as described herein and as shown in the drawing, all of the air which is introduced into the upper or combustion chamber passes through the burner boxes and is directed by means of the baffles into the combustion zone. It also will be apparent that all of the air directed by the passageways defined by the baffles is directed into flame zones. In other words, according to the present invention all the air which is introduced is directed into the flame zones.

I claim:

1. An apparatus for the production of carbon black comprising an elongated housing, a plurality of longitudinally spaced apart burner boxes in said housing, each burner box comprising a gas burner manifold therein, a plurality of spaced apart risers mounted on said manifold, a horizontal burner pipe connected to each riser, the burner pipes extending longitudinally of the housing forming laterally spaced apart longitudinally extending rows of burner pipes, a plurality of spaced apart burner nozzles on the upper side of each burner pipe, the space about each burner nozzle defining a flame zone, means for supplying gas to said burner manifold, a plurality of vertically extending intersecting baffle plates in said burner box, said baffle plates being spaced above the bottom of said burner box, the space between the bottom of the baffle and the bottom of the burner box defining an air chamber, independent conduit means in communication with the exterior of the housing for introducing air at spaced apart locations into said air chamber, damper means in said conduit means, the baffle plates defining a plurality of passageways for directing all of said air in a substantially vertical direction from said air chamber to said burner nozzles and flame zones and for confining said air to flow solely through said flame zones, said passageways inhibiting horizontal movement of the air to the burner nozzles, there being generally a separate passageway for each burner nozzle, a plurality of hoppers in said housing alternating with said burner box, a longitudinally extending rail on the inside of each side of said housing, a collector plate mounted on said rails above said hoppers and burner boxes for longitudinal reciprocation above said burner nozzles so that the carbon black formed by flames at the burner nozzles is deposited on said plate, means for removing carbon black from said collector plate including brush means mounted above each hopper, means for adjusting the height of said brush means, conveyor means below said hoppers for removing the carbon black from the hoppers to the exterior of said housing, and drive means for reciprocating said collector plate and for driving said conveyor means.

2. An apparatus according to claim 1, wherein said collector plate comprises a plurality of laterally spaced apart longitudinally extending channel shaped collector strips, a collector strip being positioned over each longitudinal row of burner nozzles so that the carbon black formed by flames at the burner nozzles is deposited between said strips, and a plurality of laterally spaced apart vertically extending probes secured to each hopper, said probes extending between said collector strips to remove carbon black deposited in the space between the said strips as the collector plate reciprocates.

3. An apparatus for the production of carbon black comprising a plurality of horizontally spaced apart burner nozzles, said nozzles being arranged in longitudinal rows, a collector plate mounted for horizontal reciprocation above said burner nozzles and comprising a plurality of laterally spaced apart collector strips, a collector strip being positioned over each longitudinal row of burner nozzles so that the carbon black formed by flames at the burner nozzles is deposited on said strips, and means between said strips for removing carbon black deposited in the spaces between said strips as said collector plate reciprocates, said means comprising upwardly extending probes having at the upper end thereof resilient metal bristles.

4. A collector plate for receiving a deposit of carbon black in a carbon black apparatus, said plate comprising a plurality of longitudinally spaced apart laterally extending hollow beams, a plurality of longitudinally extending channel shaped collector strips, each of said strips having upwardly and longitudinally extending lateral arms and an upwardly and longitudinally extending web between said arms, the upper extremity of the web extending above the upper extremities of the arms, each of said beams having a plurality of laterally spaced apart longitudinally extending slots therein, said slots extending from the under side of the beam into the hollow thereof, the upper extremity of said webs being positioned in said slots and extending into the hollow of said beams, at least one transverse opening through said webs near the upper end thereof and transverse pins in the hollows of said beams, said pins passing through said openings to secure said strips to said beams, the upper extremities of said arms abutting the under side of said beams.

5. A collector plate according to claim 4, wherein the collector plate includes a plurality of longitudinally aligned strips, the joints between longitudinally adjacent strips occurring at the beams.

6. A collector plate according to claim 5, wherein the joints are staggered.

7. An apparatus for the production of carbon black comprising burner means including a plurality of horizontally spaced apart burner nozzles, a collector plate mounted for horizontal reciprocation above said burner nozzles so that the carbon black formed by flames at the burner nozzles is deposited on said plate, means for reciprocating said collector plate, brush means beneath said collector plate for removing the carbon black deposited on said collector plate, and hopper means for receiving the carbon black removed by said brushes, said brush means including an elongated brush having vertically extending bristles, a horizontal bar for supporting said brush, said brush being secured to said bar, said bar having hollow extensions at each end of said bar, a downwardly depending brace bar near the center of said brush supporting bar, a tensioning member extending through said hollow extensions and said brace bar, means for varying the tension of said tensioning member, and means for adjusting the height of said brush supporting bar.

8. An apparatus for the production of carbon black comprising burner means including a plurality of horizontally spaced apart burner nozzles, a collector plate mounted for horizontal reciprocation above said burner nozzles so that the carbon black formed by flames at the burner nozzles is deposited on said plate, means for reciprocating said collector plate, brush means beneath said collector plate for removing the carbon black deposited on said collector plate, and hopper means for receiving the carbon black removed by said brushes, said brush means including an elongated brush having vertically extending bristles, a horizontal bar for supporting said brush, and means for varying the linearity of said bar to adjust the upper extremities of the bristles to conform with the collector plate.

9. An apparatus for the production of carbon black comprising a plurality of horizontally spaced apart burner nozzles, said nozzles being arranged in longitudinal rows, a collector plate mounted for horizontal reciprocation above said burner nozzles and comprising a plurality of laterally spaced apart collector strips, each of said collector strips having longitudinally extending vertical flanges, a collector strip being positioned over each longitudinal row of burner nozzles so that the carbon black formed by flames at the burner nozzles is deposited on said strips, and means between said strips for removing carbon black deposited in the spaces between said strips as said collector plate reciprocates, said means between said strips comprising upwardly extending probes, the upper extremities of said probes extending above the uppermost extremity of said flanges.

10. An apparatus according to claim 9, wherein the upper ends of said probes comprise resilient metal bristles.

11. An apparatus for the production of carbon black comprising an elongated housing, a plurality of longitudinally spaced apart burner boxes in said housing, each burner box comprising a gas burner manifold therein, a plurality of spaced apart risers mounted on said manifold, a horizontal burner pipe connected to each riser, the burner pipes extending longitudinally of the housing forming laterally spaced apart longitudinally extending rows of burner pipes, a plurality of spaced apart burner nozzles on the upper side of each burner pipe, means for supplying gas to said burner manifold, a plurality of vertically extending intersecting baffle plates in said burner box, said baffle plates being spaced above the bottom of said burner box, the space between the bottom of the baffles and the bottom of the burner box defining an air chamber, independent conduit means in communication with the exterior of the housing for introducing air at spaced apart locations into said air chamber, damper means in said conduit means, the baffle plates defining a plurality of passageways for conducting air in a substantially vertical direction from said air chamber to said burner nozzles, said passageways inhibiting horizontal movement of the air to the burner nozzles, there being generally a separate passageway for each burner nozzle, a plurality of hoppers in said housing alternating with said burner box, a longitudinally extending rail on the inside of each side of said housing, a collector plate mounted on said rails above said hoppers and burner boxes for longitudinal reciprocation above said burner nozzles so that the carbon black formed by flames at the burner nozzles is deposited on said plate, means for removing carbon black from said collector plate including brush means mounted above each hopper, means for adjusting the height of said brush means, conveyor means below said hoppers for removing the carbon black from the hoppers to the exterior of said housing, and drive means for reciprocating said collector plate and for driving said conveyor means, said brush means including a brush having vertically extending bristles, a brush supporting bar to which said brush is secured, said brush supporting bar having hollow extensions at both ends thereof, a downwardly depending brace bar generally centrally of said brush supporting bar, a tension member extending through said hollow extensions and said brace bar, means for varying the tension of said tension member, said housing having slots therethrough near the lateral ends of each hopper, the brush supporting bar being positioned over the hopper with the hollow extensions extending through the slots in the housing, and means on the exterior of said housing adjacent said slots for adjusting the height of said brush supporting bar.

12. In a method for the production of carbon black, wherein gas is burned in a chamber at a plurality of spaced apart burner nozzles, the space about each burner nozzle defining a flame zone, said gas being burned in air continually being introduced into said chamber to produce carbon black and the carbon black so formed is deposited on a collector member and recovered therefrom, the improvement comprising introducing substantially all of said air into said chamber from below said flame zones into said flame zones in the form of upwardly moving columns of air while inhibiting horizontal movement of the air by directing all of the air through a plurality of vertical passageways, each passageway extending from beneath a burner nozzle and extending upwardly to adjacent the burner nozzle, each passageway directing air to a flame zone whereby all of the air introduced into said chamber passes through a flame zone.

13. A method for the production of carbon black according to claim 12, wherein all of said air is introduced at atmospheric pressure and moved by convection.

14. A method for the production of carbon black according to claim 13, wherein the vertical passageways are defined by intersecting baffle plates in a criss-cross arrangement.

15. In an apparatus for the production of carbon black, a combustion chamber, a plurality of spaced apart burner nozzles in said chamber, the space about each burner nozzle defining a flame zone and means for introducing air into said chamber and into said flame zones and for controlling the flow of air for confining it to flow solely through said flame zones, said means comprising, (a) baffle means defining a plurality of vertical passageways, each passageway extending from beneath a burner nozzle and extending upwardly to adjacent the burner nozzle, each passageway being open at the top and bottom thereof, and (b) means for introducing said air only at the bottoms of the passageways, said means being the sole means for introducing air into said chamber whereby said passageways direct all of the air introduced into said chamber through the flame zones in the form of upwardly moving columns of air while inhibiting horizontal movement of the air.

16. An apparatus for the production of carbon black according to claim 15, wherein said means for introducing air into said chamber introduces said air at atmospheric pressure and by convection.

17. An apparatus for the production of carbon black according to claim 16, wherein said means for introducing said air at the bottoms of the passageways includes means for independently introducing air to separate groups of passageways and for independently controlling the flow of air to said separate groups.

18. An apparatus for the production of carbon black according to claim 17, wherein said baffle means comprises a plurality of intersecting baffle plates in a crisscross arrangement, the baffle plates forming the walls of the passageways.

19. An apparatus for the production of carbon black according to claim 18, including means separating the burner nozzles and their respective passageways into separate groups of nozzles and passageways, and wherein said means for independently introducing air and for controlling the flow of air to separate groups comprises at least one duct for each group, one end of each duct terminating below the lowermost extremities of the baffle plates defining the passageways of said group, the other end of said duct being in communication with the atmosphere, and means for controlling the flow of air through each duct.

20. An apparatus for the production of carbon black according to claim 19, wherein the means for separating the burner nozzles comprises a plurality of spaced apart burner boxes having positioned therein at least one group of burner nozzles and passageways, said ducts passing through the bottoms of said boxes.

21. An apparatus for the production of carbon black according to claim 20, wherein there is provided a baffle plate over the end of the duct terminating in the burner box for uniformly distributing the air to the bottoms of a plurality of passageways.

22. An apparatus for the production of carbon black according to claim 21, including hoppers for receiving the carbon black, said hoppers being positioned longitudinally of the apparatus between adjacent burner boxes.

23. An apparatus for the production of carbon black according to claim 22, including a collector plate mounted for horizontal reciprocation above said burner nozzles so that the carbon black formed by flames at the burner nozzles is deposited on said plate, means for reciprocating said collector plate, and means for removing the carbon black from said collector plate and depositing the carbon black into the hoppers.

24. An apparatus for the production of carbon black according to claim 23, wherein the means for removing the carbon black from said collector plate includes brush means positioned below the collector plate and above each hopper, said brush means including an elongated brush having vertically extending bristles, brush supporting means for supporting the brush over the hopper and means for leveling the brush so that the bristles contact the undersurface of the collector plate.

25. An apparatus for the production of carbon black according to claim 24, wherein said collector plate comprises a plurality of spaced apart channel shaped strips and wherein there are provided means for removing accumulated carbon black between said strips during reciprocation of said collector plate.

26. An apparatus for the production of carbon black comprising at least one burner box having a bottom, vertical side walls, and vertical end walls, a gas burner manifold in said box, a plurality of spaced apart risers mounted on said manifold, a horizontal burner pipe connected to each riser, a plurality of spaced apart burner nozzles on the upper side of each burner pipe, the space about each burner nozzle defining a flame zone, means for supplying gas to said burner manifold, a plurality of vertically extending baffle plates in said burner box, said baffle plates being spaced above the bottom of said burner box and extending upwardly to adjacent said nozzles, the space between the bottom of the baffles and the bottom of the burner box defining an air chamber, means for introducing air at spaced apart locations into said air chamber at atmospheric pressure, the baffle plates and walls defining a plurality of passageways for directing all of said air in a substantially vertical direction from said air chamber to said burner nozzles and flame zones and for confining said air to flow solely through said flame zones, said passageways inhibiting horizontal movement of the air to the burner nozzles.

27. An apparatus for the production of carbon black according to claim 26, including a housing having therein a plurality of said burner boxes, said housing and burner boxes defining a combustion chamber, said means for introducing air into the burner boxes constituting the sole means for introducing air into said combustion chamber whereby all of the air introduced into said combustion chamber passes through said flame zones.

28. An apparatus for the production of carbon black according to claim 27, wherein each passageway directs air to one flame zone.

29. An apparatus for the production of carbon black according to claim 28, wherein there is mounted in said housing in said chamber a collector plate positioned above said burner nozzles so that the carbon black formed by flames at the burner nozzles is deposited on said collector plate, and wherein there are provided hoppers, said hoppers being positioned between said burner boxes and means for removing carbon black from said collector plate and depositing said carbon black in said hoppers.

30. An apparatus for the production of carbon black according to claim 15, including a portable housing, said housing containing said chamber, burner nozzles, baffle means, means for introducing combustion air, and said means for collecting and recovering the carbon black formed at the burners, said housing comprising a base adapted to be positioned on the ground, said base being constituted by a conduit defining the lowermost periphery of said housing, said conduit constituting the gas manifold main for introducing the gas into the apparatus, said housing being defined by vertical side and end walls mounted on said conduit, and a roof mounted on said walls whereby the entire apparatus can be moved without disassembly.

31. An apparatus according to claim 30, including means for connecting a plurality of housings in tandem.

32. A portable apparatus for the production of carbon black comprising an elongated housing, a plurality of spaced apart burner nozzles in said housing, means for supplying gas to said nozzles including a gas manifold main, a collector plate reciprocably mounted above said burner nozzle, means for removing carbon black from the collector plate, means for receiving the carbon black removed from said collector plate, means for supplying combustion air to adjacent said nozzles, drive means for reciprocating said collector plate, said housing having a base positionable on the ground, said base being constituted by a conduit defining the lowermost periphery of said housing, said conduit constituting said gas manifold main, said housing being defined by vertical side and end walls mounted on said conduit, and a roof mounted on said walls, all of the recited structure being mounted on said housing whereby the entire apparatus can be moved without disassembly.

33. An apparatus according to claim 32, including means for connecting a plurality of housings in tandem.

References Cited in the file of this patent

UNITED STATES PATENTS

| | | |
|---|---|---|
| 481,240 | McNutt | Aug. 23, 1892 |
| 2,204,366 | Knapp | June 11, 1940 |
| 2,399,591 | Amon | Apr. 30, 1946 |
| 2,427,509 | Reardon | Sept. 16, 1947 |
| 2,446,351 | Williams et al. | Aug. 3, 1948 |

FOREIGN PATENTS

| | | |
|---|---|---|
| 434,393 | Great Britain | Aug. 30, 1935 |
| 545,002 | Germany | Feb. 25, 1932 |